United States Patent
Hayashi et al.

(10) Patent No.: US 11,100,338 B2
(45) Date of Patent: Aug. 24, 2021

(54) DATA RECORDING DEVICE

(71) Applicant: TOYOTA JIDOSHA KABUSHIKI KAISHA, Toyota (JP)

(72) Inventors: Yusuke Hayashi, Susono (JP);
Yasuhiro Takagi, Toyota (JP);
Nobuhide Kamata, Susono (JP); Ryo Igarashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/388,295

(22) Filed: Apr. 18, 2019

(65) Prior Publication Data
US 2019/0362161 A1  Nov. 28, 2019

(30) Foreign Application Priority Data
May 23, 2018  (JP) .............................. JP2018-099087

(51) Int. Cl.
*G06K 9/00* (2006.01)
*B60R 11/04* (2006.01)
*G01C 11/02* (2006.01)

(52) U.S. Cl.
CPC .......... *G06K 9/00791* (2013.01); *B60R 11/04* (2013.01); *G01C 11/02* (2013.01)

(58) Field of Classification Search
CPC ...... G06K 9/00791; B60R 11/04; G01C 11/02
See application file for complete search history.

(56) References Cited

U.S. PATENT DOCUMENTS

| 10,984,543 B1* | 4/2021 | Srinivasan ................ G06T 7/70 |
| 2003/0025597 A1* | 2/2003 | Schofield ............ G06K 9/6267 340/435 |

(Continued)

FOREIGN PATENT DOCUMENTS

| JP | 07182485 A | 7/1995 |
| JP | 2003134427 A | 5/2003 |

(Continued)

OTHER PUBLICATIONS

Bernardin, Keni, and Rainer Stiefelhagen. "Evaluating multiple object tracking performance: the clear mot metrics." EURASIP Journal on Image and Video Processing 2008 (2008): 1-10. (Year: 2008).*

*Primary Examiner* — Pinalben Patel
(74) *Attorney, Agent, or Firm* — Sughrue Mion, PLLC

(57) ABSTRACT

A data recording device includes at least one sensor configured to detect a surrounding environment of a moving object as detection data, a buffer configured to store the detection data in association with a time point, a tracking unit configured to perform tracking of an object being present around the moving object based on the detection data stored in the buffer, a determination unit configured to determine whether or not the object is lost during the tracking of the object performed by the tracking unit, a period determination unit configured to determine a period during which the object is determined to be lost by the determination unit as a recording period in response to a fact that a predetermined recording condition is satisfied, and a recording unit configured to record the detection data corresponding to the recording period onto a recording medium among the detection data stored in the buffer.

2 Claims, 7 Drawing Sheets

(56) References Cited

U.S. PATENT DOCUMENTS

| | | | |
|---|---|---|---|
| 2015/0336547 A1* | 11/2015 | Dagan | B60T 7/22 |
| | | | 701/70 |
| 2017/0352261 A1 | 12/2017 | Hasegawa | |
| 2018/0357484 A1 | 12/2018 | Omata | |

FOREIGN PATENT DOCUMENTS

| JP | 2010068069 A | 3/2010 |
|---|---|---|
| JP | 201 01 821 48 A | 8/2010 |
| JP | 2011248684 A | 12/2011 |
| JP | 2016119547 A | 6/2016 |
| JP | 2017138694 A | 8/2017 |

* cited by examiner

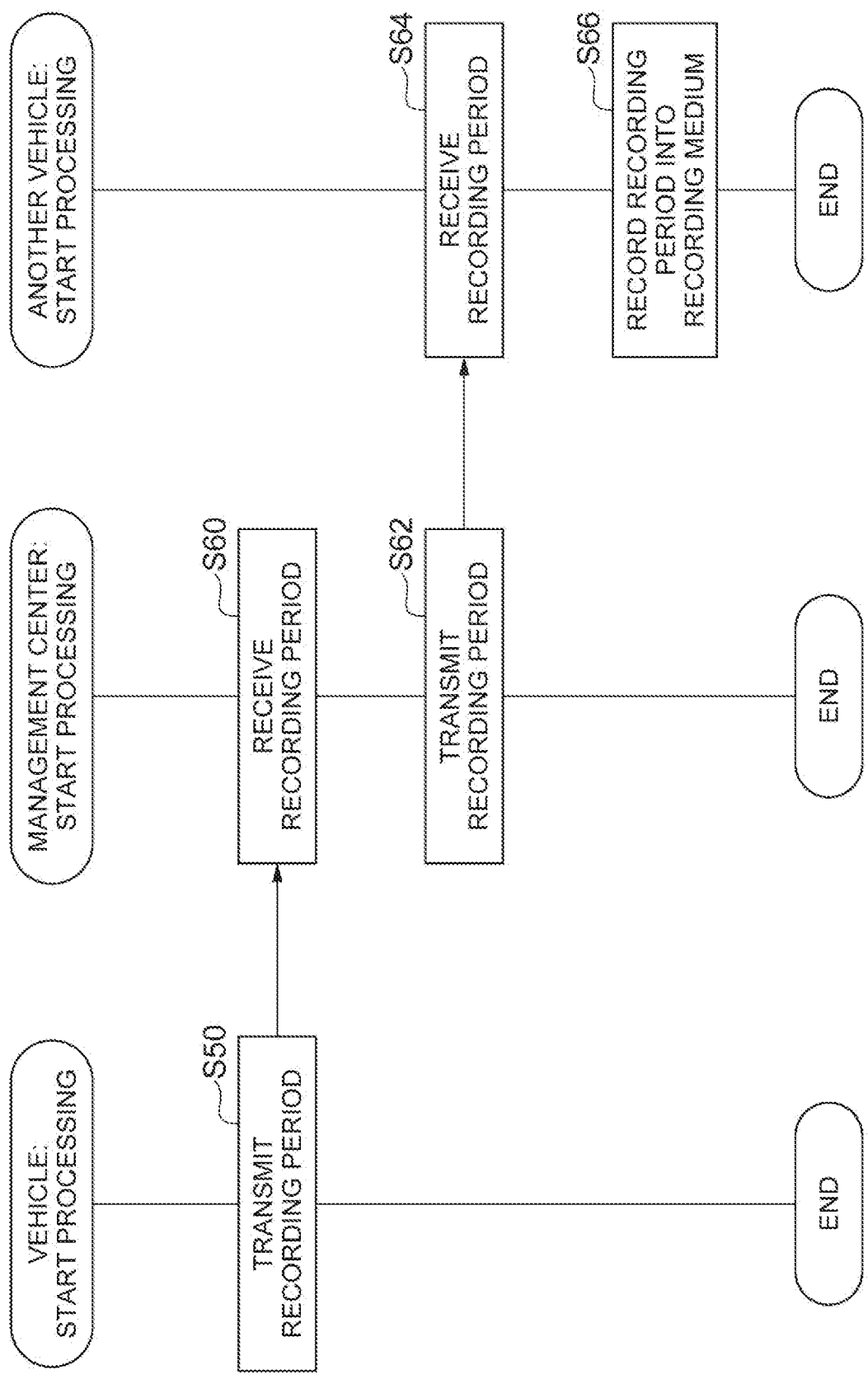

DATA RECORDING DEVICE

CROSS-REFERENCE TO RELATED APPLICATION

This application is based on Japanese Patent Application No. 2018-099087 filed with Japan Patent Office on May 23, 2018, the entire contents of which are hereby incorporated by reference.

TECHNICAL FIELD

The present disclosure relates to a data recording device.

BACKGROUND

Japanese Unexamined Patent Publication No. 2010-068069 discloses a data recording device using a vehicle-mounted camera. The data recording device records images of surroundings of a vehicle captured by the vehicle-mounted camera onto a recording medium capable of recording only the predetermined number of past captured images. The data recording device starts recording of the captured images when a relative position or a relative speed between the vehicle and an obstacle satisfies a predetermined condition. When the relative position or the relative speed between the vehicle and the obstacle does not satisfy the predetermined condition or when collision occurs, in which acceleration becomes equal to or higher than a predetermined value, the recording of the captured image is ended.

SUMMARY

In the data recording device disclosed in Japanese Unexamined Patent Publication No. 2010-068069, all the periods in which the relative position or the relative speed between the vehicle and the obstacle satisfy the predetermined condition are set as a recording period. Therefore, in some cases depending on the purpose of using data, data that does not need to be recorded may be included. For example, in a case of analysis of recorded data afterward, in order to verify whether or not an event is caused by a failure of object tracking performed by a sensor, detection data by the sensor successfully used in object tracking is not necessarily needed. The present disclosure provides a data recording device capable of appropriately recording detection data detected by the sensor, which is necessary for verifying the object tracking.

A data recording device according to an aspect of the present disclosure includes at least one sensor configured to detect a surrounding environment of a moving object as detection data, a buffer configured to store the detection data in association with a time point, a tracking unit configured to perform tracking of an object being present around the moving object based on the detection data stored in the buffer, a determination unit configured to determine whether or not the object is lost during tracking of the object performed by the tracking unit, a period determination unit configured to determine a period during which the object is determined to be lost by the determination unit as a recording period in response to a fact that a predetermined recording condition is satisfied, and a recording unit configured to record the detection data corresponding to the recording period onto a recording medium among the detection data stored in the buffer.

In the data recording device, the period during which the object is determined to be lost is determined as the recording period. The detection data corresponding to the recording period is recorded onto the recording medium. The detection data of the period during which the object is lost is useful for verification of the object tracking using the sensors. Therefore, the data recording device can appropriately record the detection data detected by the sensor, which is necessary for verifying the object tracking.

In one embodiment, the period determination unit may be configured to determine only the time point at which the object is lost as the recording period among the period during which the object is determined to be lost by the determination unit. In this case, the device can reduce data recording capacity compared to the case where the period during which the object is determined to be lost is determined as the recording period.

According to various aspects of the present disclosure, it is possible to appropriately record the detection data detected by a sensor, which is necessary for verifying the object tracking.

BRIEF DESCRIPTION OF THE DRAWINGS

FIG. 7 is a flowchart of the recording processing performed by the data recording system.

DETAILED DESCRIPTION

Figure 1:
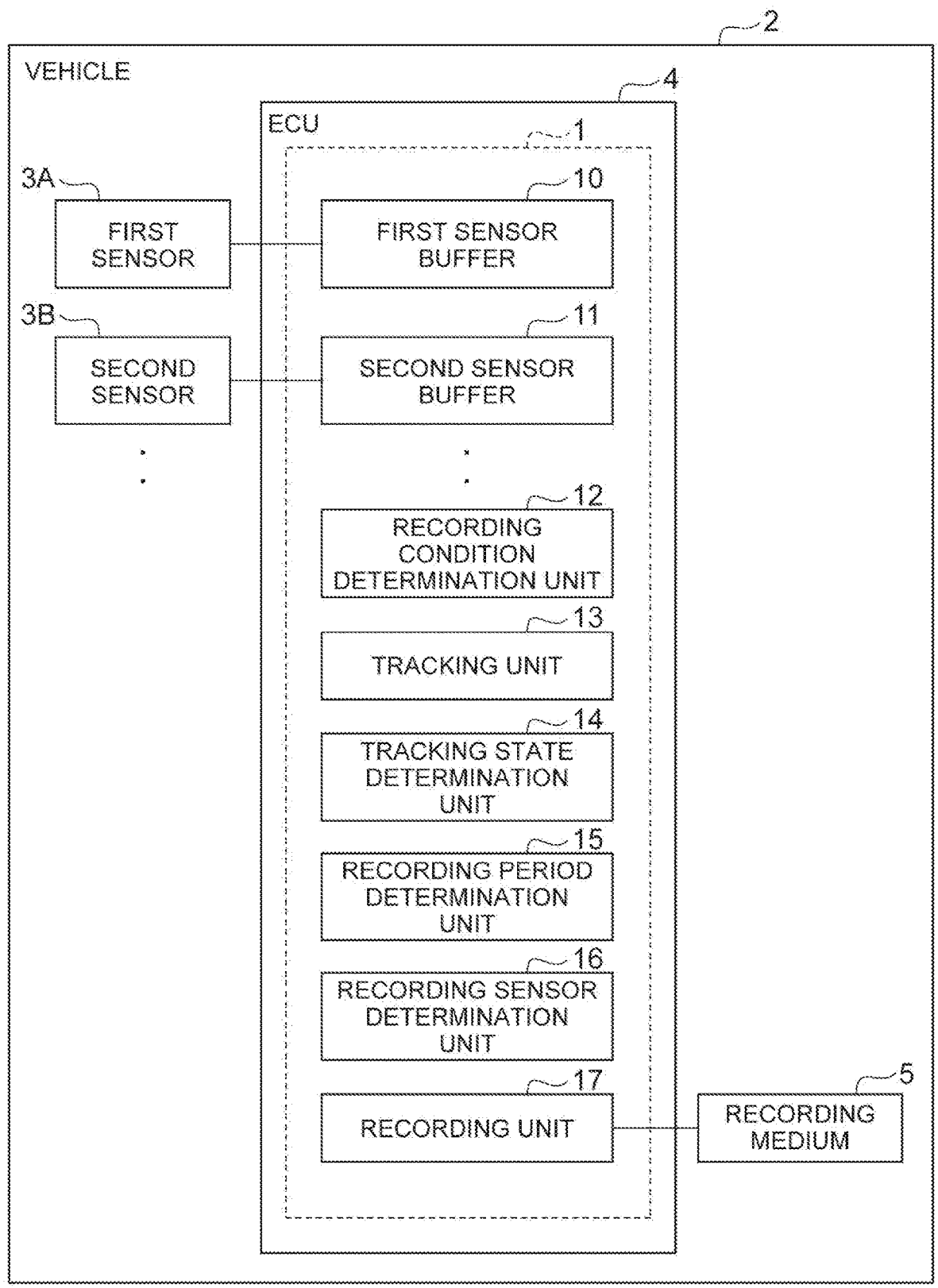
FIG. 1 is a block diagram illustrating an example of a configuration of a vehicle that includes a data recording device according to one embodiment.

Hereinafter, exemplary embodiments of the present disclosure will be described with reference to the drawings. In the description below, the same reference numerals will be given to the same or equivalent elements, and the description thereof will not be repeated.

First Embodiment

Outline of Data Recording Device

A data recording device according to one embodiment is a device that is mounted on a moving object, and records detection data detected by a sensor included in a moving object into a recording medium. The moving object is an object of which existence position can be changed, for example, an automobile, a train, an airplane, a robot, a drone, or the like. The moving object performs object tracking based on detection data as described later. The recording medium is a medium for recording information and is included in the moving object.

The detection data recorded in the data recording device can be aggregated into a server device at a predetermined timing via wired communication having a relatively high communication speed. Alternatively, the detection data may be exchanged for each recording medium, and then, may be aggregated into the server device via the wireless communication with taking a time afterward. An example of the predetermined timing is when maintenance of the moving object in a shop or the like, an anchorage of a moving object or the like. The server device can verify the object tracking of the moving object based on the detection data aggregated from the moving object. The server device can also analyze the object tracking of one moving object based on the detection data aggregated from multiple moving objects.

One Example of Data Recording Device

Hereinafter, a case where the moving object is an automobile will be described as an example. FIG. 1 is a block diagram illustrating an example of a configuration of a vehicle that includes the data recording device according to one embodiment. As illustrated in FIG. 1, a data recording device 1 is mounted on a vehicle 2 such as a passenger car. The vehicle 2 can execute autonomous driving and a driving assistance based on the object tracking, and notification of the result of tracking, and the like. Hereinafter, a case will be described as an example, in which the vehicle 2 is a vehicle that travels with the automatic driving based on the result of detection performed by the sensor, and a driver can intervene in the driving by the driving operation during the autonomous driving. The autonomous driving is a vehicle control in which the vehicle 2 is caused to autonomously travel to a destination set in advance without performing the driving operation by the driver.

The vehicle 2 includes a first sensor 3A, a second sensor 3B, an ECU 4, and a recording medium 5.

The first sensor 3A is a detection device that detects surrounding environments of the vehicle 2 as the detection data. The surrounding environment of the vehicle 2 is an external situation of the vehicle 2. The detection data is information reflecting the external situation. The first sensor 3A is, for example, a camera or a radar sensor.

The camera is an imaging device that images the external situation of the vehicle 2. For example, the camera is provided on the back side of the windshield of the vehicle 2. The camera acquires imaging information on the external situation of the vehicle 2. The camera may be a monocular camera or may be a stereo camera. The stereo camera has two imaging units arranged to reproduce binocular parallax. The imaging information by the stereo camera also includes information on the depth direction.

The radar sensor is a detection device that detects an object around the vehicle 2 using radio waves (for example, millimeter waves) or light. The radar sensor includes, for example, millimeter wave radar or light imaging detection and ranging (LIDAR). The radar sensor transmits the radio wave or light to the surroundings of the vehicle 2, and detects an object by receiving the radio waves or light reflected from the obstacle.

Similarly to the first sensor 3A, the second sensor 3B is a detection device that detects a situation (external situation) around the vehicle 2. The second sensor 3B differs from the first sensor 3A in at least one of an attachment position and a detection mechanism. For example, the first sensor 3A is a camera and the second sensor 3B is a LIDAR. For example, the first sensor 3A is a camera attached to the windshield and the second sensor 3B is a camera provided at the top of the vehicle 2.

The first sensor 3A and the second sensor 3B output the detection data as a result of detection. The detection data is used for object tracking to be described later. The vehicle 2 may include only the first sensor 3A and may not include the second sensor 3B. Alternatively, the vehicle 2 may include further sensors such as a third sensor, a fourth sensor, and the like for the object tracking. The vehicle 2 may include at least one sensor that detects the surrounding environments of the vehicle 2 as the detection data.

The ECU 4 is an electronic control unit including a central processing unit (CPU), read only memory (ROM), random access memory (RAM), a controller area network (CAN) communication circuit, and the like. The ECU 4 is connected to a network that communicates using, for example, a CAN communication circuit, and is communicably connected to the configuration elements of the vehicle 2 described above. For example, the ECU 4 realizes various functions of the configuration elements of the ECU 4 described later by operating the CAN communication circuit based on a signal output from the CPU to input and output data, recording the data in the RAM, loading the program stored in the ROM into the RAM, and executing the program stored in the RAM. The ECU 4 may be configured with a plurality of electronic control units.

The ECU 4 includes a first sensor buffer 10 (an example of a buffer), a second sensor buffer 11 (an example of a buffer), a recording condition determination unit 12, a tracking unit 13, a tracking state determination unit 14 (an example of a determination unit), a recording period determination unit 15 (an example of a period determination unit), a recording sensor determination unit 16, and a recording unit 17.

The first sensor buffer 10 is a recording medium or a recording area corresponding to the first sensor 3A. The recording area is a recording area logically set in the recording medium. The first sensor buffer 10 stores the detection data of the first sensor 3A in association with a time. The first sensor buffer 10 has a limited capacity. The first sensor buffer 10 can be managed by a first-in-first-out basis control to store the latest detection data by deleting the oldest detection data when the buffer is full.

The second sensor buffer 11 is a recording medium or a recording area corresponding to the second sensor 3B. The second sensor buffer 11 stores the detection data of the second sensor 3B in association with the time. Similarly to the first sensor buffer 10, the second sensor buffer 11 can be managed by the first-in-first-out basis control.

The first sensor buffer 10 and the second sensor buffer 11 may be logically distinguished from each other. In other words, the first sensor buffer 10 and the second sensor buffer 11 may be set in the recording media different from each other, or may be set in the same recording medium. The sensor and sensor buffer are in one-to-one correspondence. In other words, if the vehicle 2 includes a third sensor, the ECU 4 includes a third sensor buffer.

The recording condition determination unit 12 determines whether or not a recording condition is satisfied. The recording condition is a criterion set in advance for recording the result of detection performed by the sensor. An example of a recording condition is a fact that the vehicle 2 comes in contact with another vehicle. For example, the recording condition determination unit 12 can determine the contact between the vehicle 2 and another vehicle based on the result of detection performed by a contact sensor or an acceleration sensor, which is not illustrated. The recording condition determination unit 12 determines that the recording condition is satisfied when the vehicle 2 comes in contact with another vehicle or when an acceleration change equal to or higher than a predetermined value is detected. Another example of the recording condition is a driver's intervention during the autonomous driving. For example, the recording condition determination unit 12 determines that the recording condition is satisfied when the driver intervenes during the autonomous driving based on the result of detection performed by a (not illustrated) steering sensor or information output from the autonomous driving system.

The tracking unit 13 tracks the objects being present around the moving object based on the detection data stored in the buffer. The buffer is a buffer corresponding to the sensor for tracking, and includes the first sensor buffer 10 and the second sensor buffer 11 as an example. The object is a tracking target. The tracking unit 13 recognizes the object based on the detection data, and recognizes a movement of the recognized object. The movement of the object is a position of the object with a time lapse. The tracking unit 13 performs the tracking based on the time-series detection data. The tracking unit 13 may track the object in a unit of region using the template mapping, or may track the object in a unit of characteristic point using the KLT method or the like.

For example, the result of tracking performed by the tracking unit 13 can be used for the autonomous driving of the vehicle 2. For example, the result of tracking performed by the tracking unit 13 is necessary for generating an autonomous driving course. The course includes a path and a speed pattern. The course for the vehicle 2 to travel is determined by tracking another vehicle. The result of tracking by the tracking unit 13 can also be used for the driving assistance (such as a lane departure prevention function and a preceding vehicle tracking function) and an information support (displaying the result of tracking on a monitor).

The tracking state determination unit 14 determines whether or not the object is lost during the tracking of the object performed by the tracking unit 13. The lost of object means that the object has disappeared from view. That is, the lost of object means that the object recognized by the tracking unit 13 cannot be recognized. When the lost of object is repeatedly detected, the result of tracking shows that the position of the object is greatly displaced or one object is separated into two. The tracking state determination unit 14 determines whether or not an object is lost based on the presence or absence of an object that is not detected suddenly, the presence or absence of an object of which the detection position is greatly changed suddenly, and the presence or absence of an object that is separated into a plurality of objects from a certain position, based on the result of tracking performed by the tracking unit 13. The tracking state determination unit 14 monitors the result of tracking performed by the tracking unit 13 and performs the determination on real time basis. The tracking state determination unit 14 may determine whether or not the object is lost during the tracking performed by the tracking unit 13 using the memory or the like in which the result of the tracking performed by the tracking unit 13 is stored. That is, even if there may be a time difference in tracking, the tracking state determination unit 14 may perform the determination using the result of tracking obtained from an offline.

The recording period determination unit 15 determines the period during which the object is lost determined by the tracking state determination unit 14 as a recording period, in response to fact that the predetermined recording condition is satisfied. The recording period is a condition of the data stored in the recording medium 5. The data detected during the recording period by the sensor is stored in the recording medium 5. The period during which the object is lost will be described later.

As an example, when it is determined by the recording condition determination unit 12 that the predetermined recording condition is satisfied, the recording period determination unit 15 determines the period during which the object is determined to be lost, as the recording period. As an example, when it is determined by the recording condition determination unit 12 that the predetermined recording condition is not satisfied, the recording period determination unit 15 determines the predetermined period as the recording period.

The recording sensor determination unit 16 determines a sensor that outputs the detection data to be recorded as a recording sensor, in response to the fact that the predetermined recording condition is satisfied. As an example, among the sensors relating to the tracking, the recording sensor determination unit 16 determines a sensor provided at a position where the tracking target can be detected. The recording sensor determination unit 16 determines the sensor provided at a position where the tracking target can be detected based on, for example, the position of the tracking target and the imaging range of each sensor.

The recording unit 17 records the detection data corresponding to the recording period among the detection data stored in the buffer into the recording medium 5. The buffer is a buffer corresponding to the sensor for tracking, and includes the first sensor buffer 10 and the second sensor buffer 11 as an example. When the recording sensor is determined by the recording sensor determination unit 16, the recording unit 17 records the detection data corresponding to the recording period among the detection data stored in the buffer corresponding to the recording sensor into the recording medium 5. The recording unit 17 may record the detection data into the recording medium 5 in association with other information.

The recording medium 5 is a device for recording the data. Examples include a hard disk drive (HDD) and a flash memory. The data stored in the recording medium 5 is aggregated into the server device. The recording medium 5 may be physically identical to the first sensor buffer 10 and/or the second sensor buffer 11 or may be different from each other as long as the recording medium 5 is logically separated from the first sensor buffer 10 and the second sensor buffer 11.

The data recording device 1 includes the first sensor buffer 10, the second sensor buffer 11, the recording condition determination unit 12, the tracking unit 13, the tracking state determination unit 14, the recording period determination unit 15, the recording sensor determination unit 16, and the recording unit 17 described above.

When result of determination of the recording condition is received from another device or the ECU, the data recording device 1 may not include the recording condition determination unit 12. The data recording device 1 may not include the recording sensor determination unit 16 if only one sensor is used for tracking.

One Example of Period during which Object is Determined to be Lost

Figure 2:
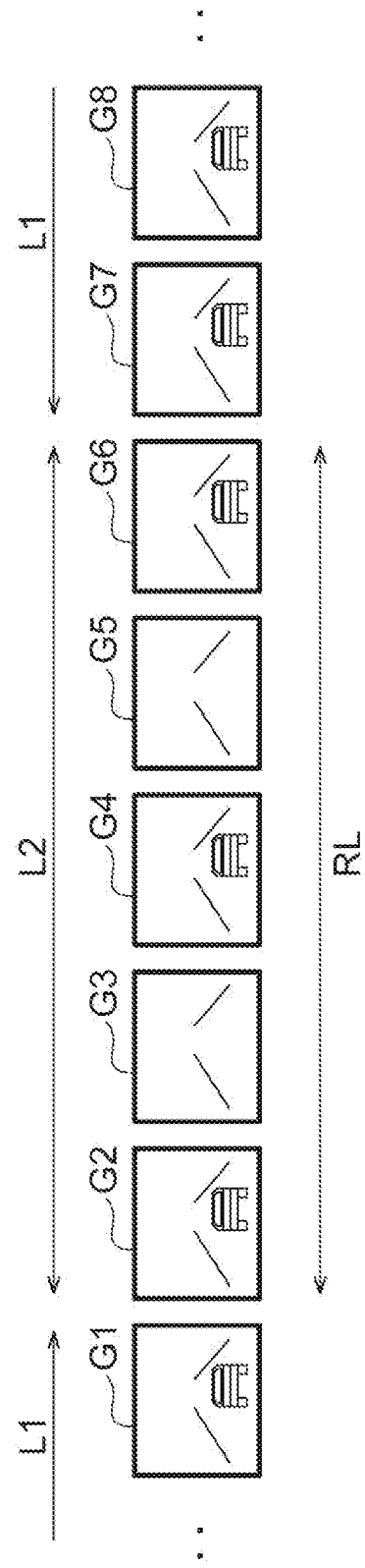
FIG. 2 is a diagram for explaining an example of setting a recording period.

An example of the period during which the object is lost will be described. FIG. 2 is a diagram for explaining an example of setting the recording period. As illustrated in FIG. 2, the results of tracking G1 to G8 are arranged in time series from left to right. The result of tracking does not need to be drawn, but it is drawn here for the explanation. The results of tracking G1 to G8 are the results of tracking at the time points t1 to t8.

An example of the tracking target by the tracking unit 13 is a preceding vehicle. As illustrated in the results of tracking G1 to G8, the results of tracking G1, G2, G4, G6, G7, and G8 are examples of recognizing the preceding vehicle. On the other hand, the results of tracking G3 and G5 are examples in which the preceding vehicle is lost. A period L1 during which the object is not lost is the period during which the tracking is stable. On the other hand, a period L2 including the time points t3 and t5 when the object is lost is a period during which the tracking is unstable. The recording period determination unit 15 determines the period L2 during which the tracking is unstable as a recording period RL.

In FIG. 2, the recording period determination unit 15 determines the time points t2 to t6 including the time before and after the time points t3 and t5 at which the object is lost as the period L2, but not limited to thereto. For example, the recording period determination unit 15 may set the time points t3 to t5 as the period L2, or the time points t2 to t5 as the period L2 using the time points at which the object is lost. In short, the period L2 may be set so as to include at least the time points at which the object is lost.

Operation Example of Data Recording Device

Figure 3:
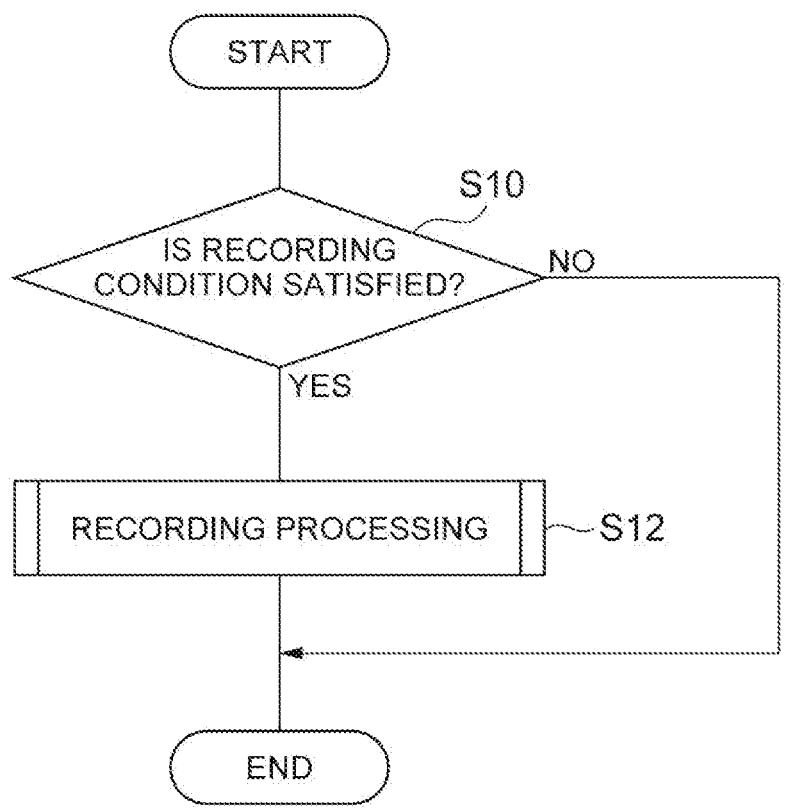
FIG. 3 is a flowchart illustrating an operation of the data recording device.

FIG. 3 is a flowchart illustrating the operation of the data recording device. The flowchart illustrated in FIG. 3 is executed, for example, at the timing when the operation start button of the data recording device 1 is turned on. It is assumed that the tracking unit 13 and the tracking state determination unit 14 of the data recording device 1 are always operating from the timing when the sensor is turned on.

As illustrated in FIG. 3, the recording condition determination unit 12 of the data recording device 1 determines whether or not the recording condition is satisfied, as a determination process (S10). When the vehicle 2 comes in contact with another vehicle and when an acceleration change equal to or higher than a predetermined value is detected, the recording condition determination unit 12 determines whether or not the recording condition is satisfied based on the predetermined conditions, such as when there is a driver's intervention.

When it is determined that the recording condition is satisfied (YES in S10), the data recording device 1 performs recording processing (S12). Details of the recording processing (S12) will be described later. When it is determined that the recording condition is not satisfied (NO in S10) and when the recording processing (S12) ends, the flowchart illustrated in FIG. 3 ends. When the end condition is not satisfied, the data recording device 1 executes again the flowchart illustrated in FIG. 3 from the beginning. The end condition is, for example, a timing when the operation end button of the data recording device 1 is turned on.

Details of Recording Processing

Figure 4:
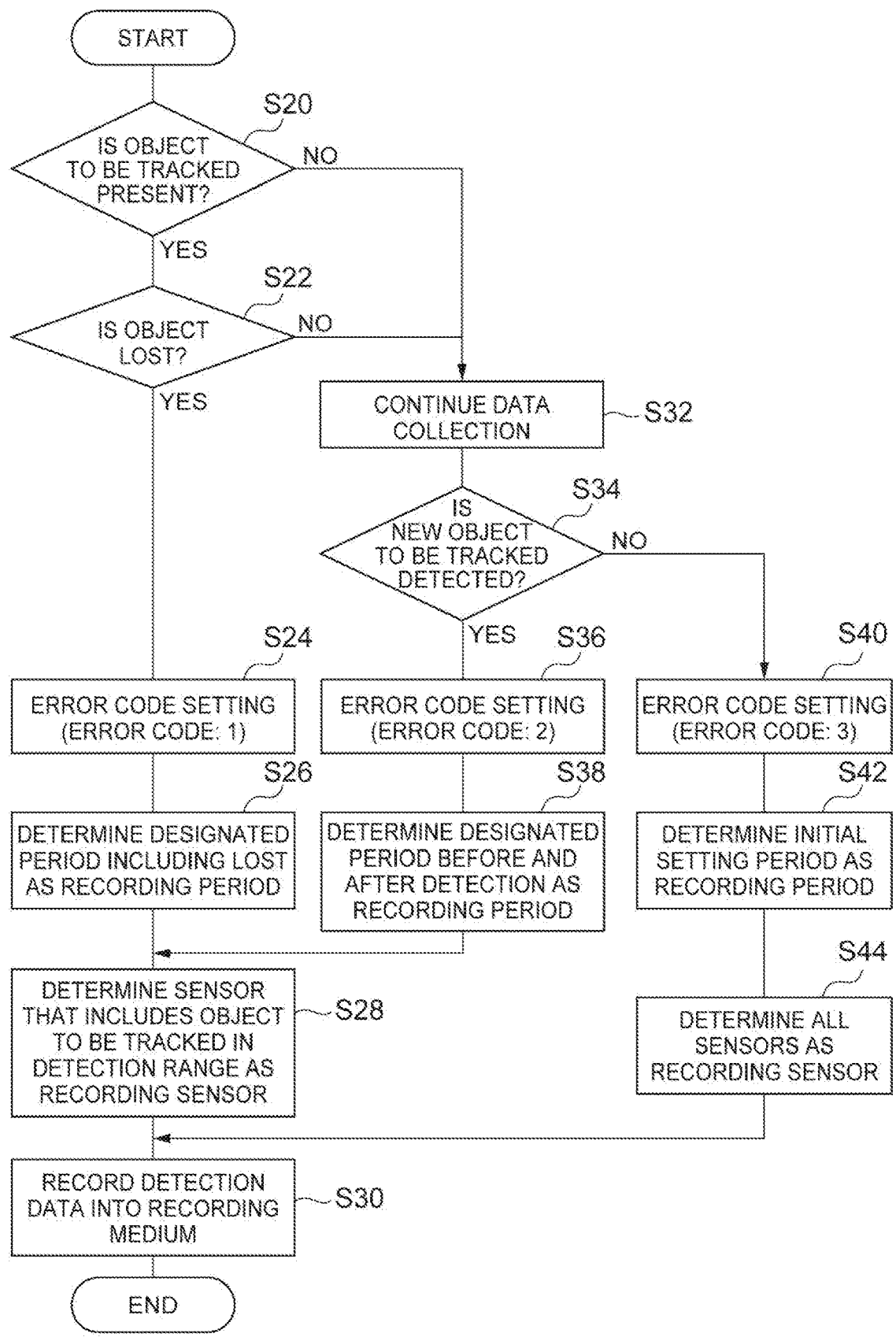
FIG. 4 is a flowchart of the recording processing in FIG. 3.

FIG. 4 is a flowchart illustrating the recording processing in FIG. 3. In FIG. 4, the object to be tracked is a preceding vehicle. As illustrated in FIG. 4, as determination processing (S20), the data recording device 1 determines whether or not the object to be tracked is present. When a moving object is included in the detection data, the tracking unit 13 tracks the moving object. When the tracking by the tracking unit 13 is started, the data recording device 1 determines that the object to be tracked is present.

When it is determined that the object to be tracked is present (YES in S20), as the lost determination processing (S22), the data recording device 1 determines whether or not the tracking state determination unit 14 determines that the object is lost.

When the tracking state determination unit 14 determines that the object is lost (YES in S22), the data recording device 1 sets an error code "1" as error code setting processing (S24). The error code is an identifier that identifies the scene from which the detection data is acquired, and is associated with the detection data. The error code can be used when reading the detection data using a server device or the like. The error code "1" indicates a scene in which the tracking of the object to be tracked is recognized as unstable.

Next, as the first period determination processing (S26), the recording period determination unit 15 of the data recording device 1 determines a designated period including the lost as the recording period. For example, the period L2 in FIG. 2 is set as the recording period RL.

Subsequently, as sensor determination processing (S28), the recording sensor determination unit 16 of the data recording device 1 determines the recording sensor from the vehicle-mounted sensors. The recording sensor determination unit 16 determines a sensor mounted at a position where the preceding vehicle can be detected as a recording sensor. That is, the recording sensor determination unit 16 determines a sensor that includes the object to be tracked in the detection range as a recording sensor. For example, when the first sensor 3A is a sensor that acquires the information in front of the vehicle 2 and the second sensor 3B is a sensor that acquires the information behind the vehicle 2, the recording sensor determination unit 16 determines the first sensor 3A as the recording sensor.

Subsequently, as recording processing (S30), the recording unit 17 of the data recording device 1 records the detection data into the recording medium 5. The recording unit 17 records the detection data corresponding to the recording period determined in the first period determination processing (S26) and the recording target detection data detected by the sensor determined in the sensor determination processing (S28) into the recording medium 5. The recording unit 17 can also record the error code set in the error code setting processing (S24) and the detection data into the recording medium 5 in association with each other. Furthermore, the recording unit 17 may also record auxiliary data such as data received from a (not illustrated) GPS receiver into the recording medium 5 in association with the detection data. When the recording processing (S30) ends, the flowchart illustrated in FIG. 4 ends. In this way, one set of data including the error code "1", the detection data, and the auxiliary data is recorded.

When it is determined that the object to be tracked is not present (NO in S20), or when it is determined by the tracking state determination unit 14 that the object is not lost (NO in S22), it is a state in which there is no unstable tracking state and is a state in which the cause of the recording condition being satisfied cannot be specified. As a possibility, in some cases, the recording condition may be satisfied due to a collision or approach to an undetected vehicle. Therefore, data collection continuation processing (S32), the data recording device 1 continues the detection by the first sensor 3A and the second sensor 3B during a predetermined period in expectation of detecting the undetected vehicle.

Subsequently, as determination processing (S34), the data recording device 1 determines whether or not a new object to be tracked is detected in the predetermined period.

When it is determined that a new object to be tracked is detected during the predetermined period (YES in S34), as error code setting processing (S36), the data recording device 1 sets an error code "2". The error code "2" indicates a scene in which there is no unstable tracking state and a new object to be tracked is detected afterward.

Subsequently, as second period determination processing (S38), the recording period determination unit 15 of the data recording device 1 sets a predetermined period as the recording period. The recording period determination unit 15 may set a period during which a new target vehicle is detected, as the recording period. The recording period determination unit 15 may set a predetermined period before and after the time points when a new target vehicle is detected, as the recording period.

When the second period determination processing (S38) ends, the sensor determination processing (S28) and the recording processing (S30) are performed as described above. When the recording processing (S30) ends, the flowchart illustrated in FIG. 4 ends. In this way, one set of data including the error code "2", the detection data and the auxiliary data is recorded.

When it is determined that a new object to be tracked is not detected during a predetermined period (NO in S40), the data recording device 1 sets an error code "3" as the error code setting processing (S36). The error code "3" indicates a scene in which there is no unstable tracking state and a new object to be tracked is not detected.

Subsequently, as third period determination processing (S42), the recording period determination unit 15 of the data recording device 1 sets a predetermined period as the recording period. The recording period determination unit 15 may set an initial setting period as the recording period.

Subsequently, as sensor determination processing (S44), the recording sensor determination unit 16 of the data recording device 1 determines all the sensors of the vehicle-mounted sensors as the recording sensor. When the sensor determination processing (S44) ends, the recording processing (S30) is performed as described above. When the recording processing (S30) ends, the flowchart illustrated in FIG. 4 ends. In this way, one set of data including the error code "3", the detection data, and the auxiliary data is recorded.

Summary of First Embodiment

In the data recording device 1, the period L2 during which the object is determined to be lost is determined as the recording period RL. The detection data corresponding to the recording period RL is recorded in the recording medium 5. The detection data of the period during which the object is lost is useful for verification of the object tracking using the first sensor 3A and the second sensor 3B. For example, there is a scene in which a preceding vehicle is detected by the sensor in and is lost in some time because the preceding vehicle is present in the distance and is less visible. Alternatively, when the preceding vehicle is a truck, there are scenes in which two of a cab and a loading portion are recognized as different vehicles or recognized as one vehicle. In these scenes, when there is detection data of the period during which the object is lost, the algorithm of the object tracking can be enhanced or improved. Therefore, the data recording device 1 can appropriately record the detection data detected by the sensor, which is necessary for verifying the object tracking.

Furthermore, depending on the shape, surface condition, angle, and the like of the preceding vehicle, the radar sensor hardly returns, and in some cases it may not be able to track the preceding vehicle from the beginning. When the preceding vehicle can be detected after the driver intervenes in the autonomous driving, the data recording device 1 sets a period to the time when the detection is performed, as the recording period. In this way, since the detection data in the scenes in which the radar sensor hardly returns can be acquired, it is possible to enhance and improve the algorithm of the object tracking using the minimum necessary detection data.

Furthermore, the data recording device 1 does not record the detection data into the recording medium 5 during the period when the object tracking is stable. Therefore, the data capacity can be reduced. When the data recording capacity into the recording medium 5 is reduced, the capacity of transferring the data from the recording medium 5 to the server device is also reduced, and thus, the communication capacity can be reduced.

Second Embodiment

A data recording device according to a second embodiment is different from the data recording device 1 according to the first embodiment in a point that the recording periods determined by the recording period determination unit 15 are different from each other and others are the same. Hereinafter, the differences between the first embodiment and the second embodiment will be described, and redundant descriptions will be omitted.

The recording period determination unit 15 of the data recording device according to the second embodiment sets only a time point when the object is lost among the period L2 during which the object is determined to be lost by the tracking state determination unit 14, as the recording period. The other configurations of the data recording device according to the second embodiment is the same as those the data recording device 1.

Other Example of Period During Which Object is Determined to be Lost

Figure 5:
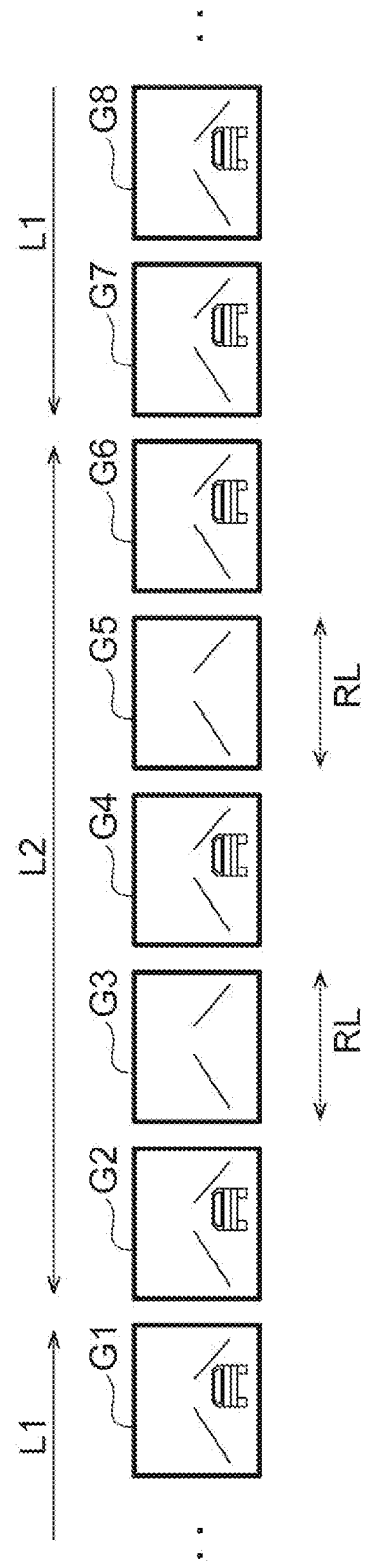
FIG. 5 is a diagram for explaining another example of setting the recording period.

Other example of the period during which the object is lost will be described. FIG. 5 is a diagram for explaining another example of setting the recording period. As illustrated in FIG. 5, when compared to FIG. 2, instead of setting the period L2 as the recording period RL, only the time points t3 and t5 at which the preceding vehicle is lost among the period L2 are determined as the recording periods RL.

Summary of Second Embodiment

According to the data recording device in the second embodiment, the data recording capacity into the recording medium 5 can be reduced compared to the case where the period L2 during which the object is determined to be lost is set as the recording period RL. When the data recording capacity into the recording medium 5 is reduced, the capacity of transferring the data from the recording medium 5 to the server device is also reduced, and thus, the communication capacity can be reduced.

Third Embodiment

A data recording device according to the third embodiment has the same configuration as the data recording device 1 according to first embodiment, and a difference is only a point that the recording period set by the vehicle 2 is expanded to another vehicle via the management center, and others are the same. Hereinafter, the redundant descriptions of the first embodiment and the second embodiment will be omitted.

Figure 6:
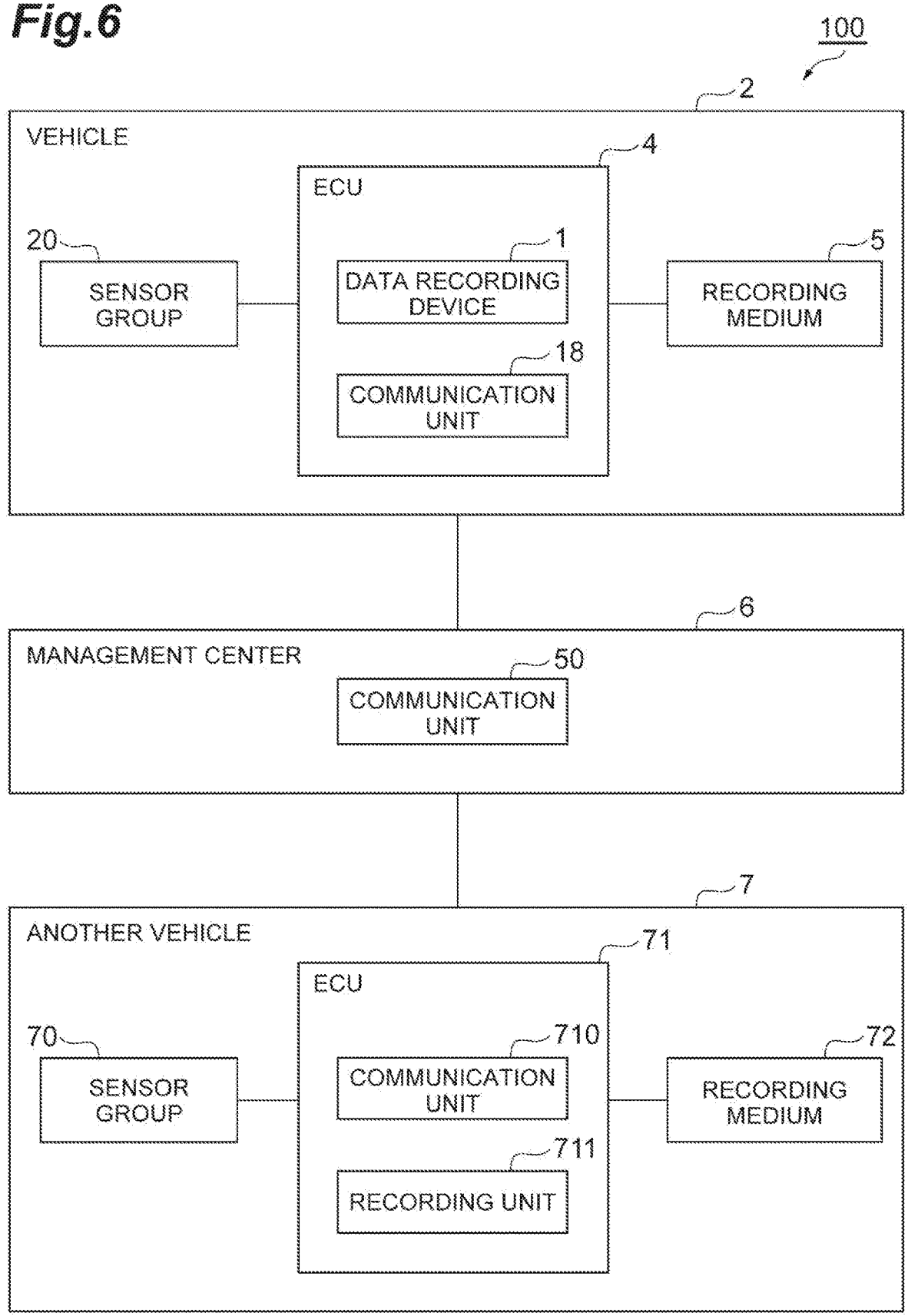
FIG. 6 is a block diagram illustrating a configuration of a data recording system.

FIG. 6 is a block diagram illustrating a configuration of the data recording system. As illustrated in FIG. 6, a data recording system 100 includes the vehicle 2, a management center 6, and another vehicle 7.

The vehicle 2 is different from the vehicle 2 in the first embodiment in a point that the ECU 4 includes a communication unit 18, and others are the same. In FIG. 6, the first sensor 3A and the second sensor 3B are illustrated as a sensor group 20. The communication unit 18 is a network device that performs wireless communication with the management center 6. The communication unit 18 transmits the recording period RL determined by the data recording device 1 to the management center 6.

The management center 6 is a computer including a CPU, ROM, RAM and the like. The management center 6 includes a communication unit 50 that communicates with the vehicle 2. The communication unit 50 is a network device that performs wireless communication with the communication unit 18 in the vehicle 2. The management center 6 receives the recording period RL from the vehicle 2 and transmits the recording period RL to another vehicle 7.

The other vehicle 7 includes a sensor group 70 configured with one or a plurality of sensors, an ECU 71, and a recording medium 72. The sensor group 70 includes at least one sensor that detects the surrounding environment of the other vehicle 7. The ECU 71 is an electronic control unit including a CPU, ROM, RAM, a CAN communication circuit, and the like. The ECU 71 includes a communication unit 710 and a recording unit 711.

The communication unit 710 is a network device that performs wireless communication with the communication unit 50 of the management center 6. The communication unit 710 receives the recording period RL from the management center 6. The recording unit 711 stores the detection data by the sensor group 70 corresponding to the received recording period RL into the recording medium 72. The recording medium 72 is a device for recording the data, for example, an HDD or a flash memory.

The management center 6 may include at least one the other vehicle 7. That is, there may be a plurality of the other vehicles 7.

Operation Example of Data Recording System

FIG. 7 is a flowchart illustrating recording processing by the data recording system. The flowchart illustrated in FIG. 7 is executed, for example, at the timing when the recording period is determined in the vehicle 2.

As illustrated in FIG. 7, as transmission process (S50), the communication unit 18 in the vehicle 2 transmits the recording period to the management center 6. As reception processing (S60), the communication unit 50 of the management center 6 receives the recording period from the vehicle 2. As transmission processing (S62), the communication unit 50 of the management center 6 transmits the recording period to the other vehicle 7.

As reception processing (S64), the communication unit 710 of the other vehicle 7 receives the recording period from the management center 6. As recording processing (S66), the recording unit 711 of the other vehicle 7 records the recording period determined by the vehicle 2 into the recording medium 72. The flowchart illustrated in FIG. 7 ends.

Summary of Third Embodiment

According to the data recording system that includes the data recording device according to the third embodiment, it is possible to expand the recording period set in the vehicle 2 to another vehicle 7. In this way, it is also possible to verify the status or the like that cannot be checked due to the angle of the vehicle 2 using detection data from the other vehicle 7.

The embodiments described above can be implemented in various modes with various modifications and improvements based on knowledge of those skilled in the art.

For example, in FIG. 4, the error code setting processing (S24, S36, and S40) and the sensor determination processing (S28 and S44) may not be performed. The error code setting processing, the period determination processing, the sensor determination processing can be performed in random order.

When the recording medium 5 and the buffers of the sensors such as the first sensor buffer 10 are physically operated in one recording device, instead of the writing operation into the recording medium 5, the same effect as in the embodiment can be obtained by prohibiting the writing of the data that is to be written.

When the capacity of the recording medium 5 is used up, priority may be set for the data and the data may be deleted in an order of the priority. The priority may be set using the error code. For example, the error code "1" may have a higher priority than the error codes "2" and "3". Alternatively, a part of the data may be deleted based on the error code. For example, when the error codes are "2" and "3", since the period is set to be long, the first part of the data can be deleted.

What is claimed is:

1. A data recording device comprising:
   at least one sensor configured to detect a surrounding environment of a moving object as detection data; and
   an electronic control unit (ECU) including at least one processor programmed to:
   store, in a buffer, the detection data in association with a time point;
   perform tracking of an object recognized around the moving object based on the detection data stored in the buffer;
   determine whether object is lost during tracking of the object, wherein the object is determined as lost during tracking if the object was previously recognized and is not currently recognized;
   determine a period during which the object is determined to be lost as a recording period in response to a fact that a predetermined recording condition is satisfied; and
   among the detection data stored in the buffer, record the detection data corresponding to the recording period onto a recording medium, wherein the predetermined recording condition is satisfied when the vehicle comes in contact with another vehicle, when an acceleration change equal to or higher than a predetermined value is detected, or when the driver intervenes during autonomous driving of the moving object.

2. The data recording device according to claim 1, wherein the ECU is programmed to determine only the time point at which the object is lost as the recording period among the period during which the object is determined to be lost.

* * * * *